United States Patent

Sciuchetti

[15] 3,689,897

[45] Sept. 5, 1972

[54] SWITCHING MAXTRIX CONTROL CIRCUIT FOR HANDLING REQUESTS ON A FIRST-COME FIRST-SERVE PRIORITY BASIS

[72] Inventor: Larry L. Sciuchetti, Arcadia, Calif.

[73] Assignee: Burroughs Corporation, Detroit, Mich.

[22] Filed: Jan. 13, 1971

[21] Appl. No.: 106,063

[52] U.S. Cl. .......... 340/172.5
[51] Int. Cl. .......... G06f 3/00
[58] Field of Search .......... 340/172.5, 166

[56] References Cited

UNITED STATES PATENTS

| | | | |
|---|---|---|---|
| 3,274,554 | 9/1966 | Hopper et al. | 340/172.5 |
| 3,447,135 | 5/1969 | Calta et al. | 340/172.5 |
| 3,300,763 | 1/1967 | Hoehmann | 340/172.5 |
| 3,449,722 | 6/1969 | Tucker | 340/172.5 |

*Primary Examiner*—Paul J. Henon
*Assistant Examiner*—Melvin B. Chapnick
*Attorney*—Christie, Parker & Hale

[57] ABSTRACT

There is described a control for a switching matrix providing an interchange between a group of requesting units and a group of terminal units. In response to a request for a connection to any designated terminal unit by a requesting unit, the designation of the requesting unit is inserted in the bottom of a stack memory. The contents of the stack are then scanned from the top to the bottom. As each requesting unit designation stored in the stack is read out, a check is made if the requested terminal unit is busy. If not, the designation of the requested terminal unit is stored and a connection is completed through the switching matrix between the two units. The requesting unit designation is then cleared from the stack.

12 Claims, 7 Drawing Figures

INVENTOR.
LARRY L. SCIUCHETTI

BY

Christie, Parker & Hale
ATTORNEYS

SWITCHING MAXTRIX CONTROL CIRCUIT FOR HANDLING REQUESTS ON A FIRST-COME FIRST-SERVE PRIORITY BASIS

FIELD OF THE INVENTION

This invention relates to control of a switching exchange in a data processing system, and more particularly is concerned with a circuit for handling requests on a first-come, first-served basis.

BACKGROUND OF THE INVENTION

In complex data processing systems, it is well known to provide several processors which process data stored in a number of data storage units. Communication between the processors, as the requesting units, is through an exchange, usually in the form of a cross-point matrix, by means of which a communication link may be completed with any one of a plurality of terminal storage units. Control of such an exchange usually includes some means of resolving the order in which the requests are serviced and establishing the priority in which requests for access to the same unit are resolved. One commonly used arrangement is to provide circuitry which always gives priority on a predetermined basis. In such an arrangement, one particular requestor always takes priority over lower order priority requestors but may be locked out by higher priority requestors. This means that if a particular terminal unit is continually accessed by higher priority requesting units, lower priority requesting units may never be serviced.

Another priority circuit arrangement provides for servicing the requesting unit in sequence. Thus, when one requesting unit completes communication with a particular storage unit, the next requesting unit in the sequence gains access to that storage unit. While such an arrangement prevents a particular requesting unit from being locked out due to its low priority assignment, the sequential system makes no allowance for the order in which the requests for access are received.

In copending application Ser. No. 840,208, filed July 9, 1969, now U.S. Pat. No. 3,638,198, and assigned to the same assignee as the present invention, there is described a cross-point matrix control circuit which resolves priority primarily on a first-come, first-served basis. Simultaneous requests are handled in sequence. The arrangement described in this copending application independently completes a connection between a requesting unit and a terminal unit as long as the requested terminal unit is available and there are no conflicts between requesting units. If a terminal unit is busy at the time of a request, the address identifying the requesting unit is placed in the bottom of a stack. When conflicts exist between two requesting units for connection to the same terminal unit, priority is always granted to the requesting unit whose address is highest in the stack. Resolution of priority requires simultaneous comparisons between a maximum of all of the requesting units. This is no problem where the number of requesting units is, for example, only four, as shown in the preferred embodiment described in the above-identified application. This requires only six simultaneous comparisons. However, if the number of requesting units is doubled to eight, this would require a total of 28 simultaneous comparisons, resulting in a large amount of hardware to carry out the control function.

SUMMARY OF THE INVENTION

The present invention is directed to a cross-point matrix control in which priority is resolved on a first-come, first-served basis where more than one requesting unit is contending for the same terminal unit. Each requesting unit, when initiating a request, has an identifying address stored in the bottom of a stack. The stack is scanned from top to bottom. As the address of each requesting unit stored in the stack is read out, a determination is made as to whether the requested terminal unit is available to be connected to the requesting unit designated in the stack register. If available, the connection is completed through the cross-point matrix and the address of the requesting unit is deleted from the stack. By this arrangement only one comparison is made at any given time between the terminal unit for which a particular requesting unit is contending and the availability of that terminal unit.

BRIEF DESCRIPTION OF THE DRAWINGS

For a more complete understanding of the invention, reference should be made to the accompanying drawings wherein.

DETAILED DESCRIPTION

Figure 1:
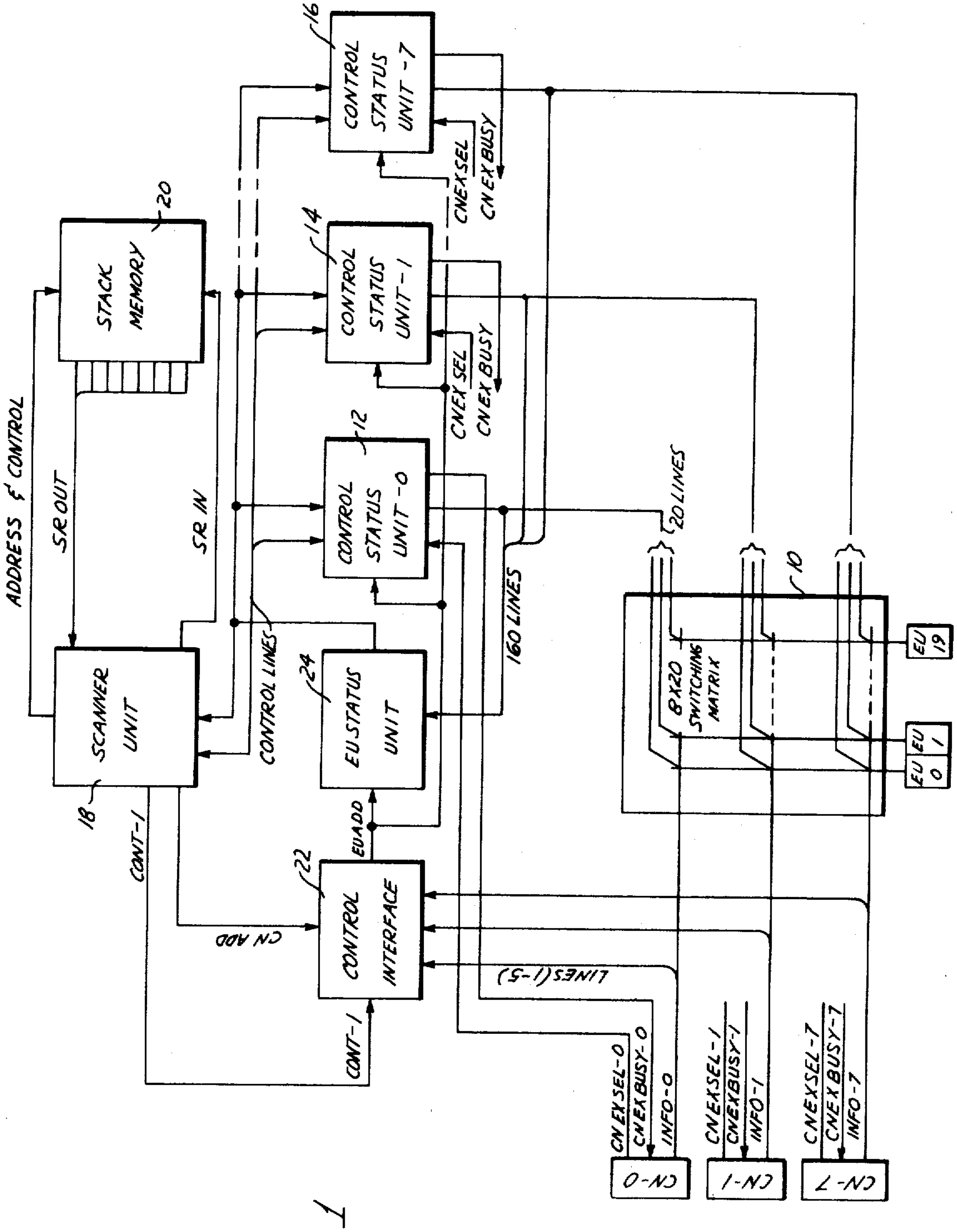
FIG. 1 is a block diagram of the switching matrix and control.

Referring to FIG. 1 in detail, the numeral 10 indicates generally a cross-point switching matrix which, by way of example only, is shown as an 8 × 20 matrix providing 160 cross-point connections. Such switching matrices are well known and commonly used where information lines from any one of a first group of units is to be selectively connected to information lines from any one of a second group of units. 160 control lines selectively activate any of the cross-points of the matrix to complete the connection at the cross-point.

A first group of eight requesting units, designated CN–0 through CN–7, each have information lines forming the respective rows of the switching matrix. The second group of terminal units, designated EU–0 through EU–19, provide information lines which form the respective columns of the matrix. Each of the first group of units CN acts as a requesting unit and is provided with an output control line, designated CNEXSEL, which signals when a connection through the switching matrix is being requested. Five of the information lines from the requesting unit CN are used, for example, to designate in binary coded form the address of the particular terminal unit to which a connection is being requested. An input control line to each requesting unit CN, designated CNEXBUSY, is used to signal the requesting unit that the terminal unit is busy or available for connection to the requesting unit.

The control circuit is provided with eight control status units, three of which are indicated at 12, 14 and 16, there being one control status unit for each requesting unit CN. Each control status unit has a group of 20 output lines which go to the switching matrix 10 for activating a corresponding one of the 20 cross-point connections associated with the corresponding one of the requesting units. Each control status unit, as will be hereinafter described in more detail, has four operating states, the first state being an Idle state ( state 1 ) in which the status unit remains until it receives a request from the associated requesting unit CN. After a request is signaled by the CNEXSEL line, the control status unit goes into a Contending state (state 2) in which it signals a scanner unit 18 by means of interconnected control lines to insert an address in the bottom of a stack memory 20 identifying the associated requesting unit CN. The scanner unit 18, in response to the control status unit, stores the address over an SRIN line into the bottom of the stack memory 20 and adjusts the contents of the stack memory 20 upward. The control status unit then goes into a Waiting Connection state (state 3) in which it waits for the scanner unit 18 to signal that a connection can be completed to the requested terminal unit. While in this state, the scanner unit 18 scans the contents of the stack memory starting at the top. Whenever an address of a requesting unit CN is read out of the stack memory over the SROUT line to the scanner unit 18, the address is applied to a control interface circuit 22 over a CNADD line. The control interface circuit 22 also receives the five information lines from each of the requesting units CN designating the addresses of particular terminal units EU. The control interface 22 in response to the particular CN address received from the scanner unit selects the terminal unit address from the corresponding one of the requesting units CN and applies it to an output line designated EUADD. This address of the terminal unit EU is thus applied to an EU status unit 24 to which the 160 cross-point control lines from the control status units are also applied. The EU status unit 24 determines whether the terminal unit designated by the EU address on the input EUADD is already connected at a cross-point in the matrix. If so, the EU status unit provides a signal indicating a busy condition on the output line, designated EUBUSY, which goes to the scanner unit 18 and each of the control status units. As long as the busy condition is indicated by the output of the EU status unit 24, the control status unit remains in the third state, but once the busy condition goes off, indicating that the terminal unit is again available to be connected to a requesting unit, the control status unit goes into the Connection Complete state ( state 4). During this state it stores the terminal unit address EUADD from the control interface 22 and activates a corresponding one of the 20 output lines to complete the desired cross-point connection in the switching matrix 10. The control status unit remains in the fourth state until the associated requesting unit CN signals a termination of the request on the CNEXSEL control line. Also during the fourth state, the control status unit signals a busy condition back to the requesting unit CN over the CNEXBUSY line.

The scanner unit 18 has three operating states. In the first state ( ST=0), the scanning unit receives signals from any of the control status units and in response thereto stores the corresponding CN address, on a predetermined priority basis, in the bottom of the stack memory, adjusting the stack memory upwards. In the second state ( ST=1), it signals the particular control status unit that the address has been stored in the stack memory. During the third state ( ST=2), it causes the stack memory to be scanned and each address stored in the stack memory read out in sequence starting at the top of the stack. As each address is read out of the stack memory into the scanner unit 18, a control signal, designated CONT–1, is generated which initiates a determination by means of the control interface 22 and the EU status unit 24 whether the terminal unit requested by the designated requesting unit is now available. If it is available, the scanner unit 18 then deletes the corresponding address from the stack memory 20. Thus as each request is received, an address of the requesting unit is placed in the stack memory 20 at the bottom of the stack. If more than one request is received, each address is transferred to the stack memory in sequence. After the addresses of all requesting units are stored in the stack, the scanner unit 18 initiates a scan of all addresses in the stack memory 20, insuring that each request is serviced on the basis of a first address placed in the stack being the first to be serviced during a scan operation.

Figure 2:
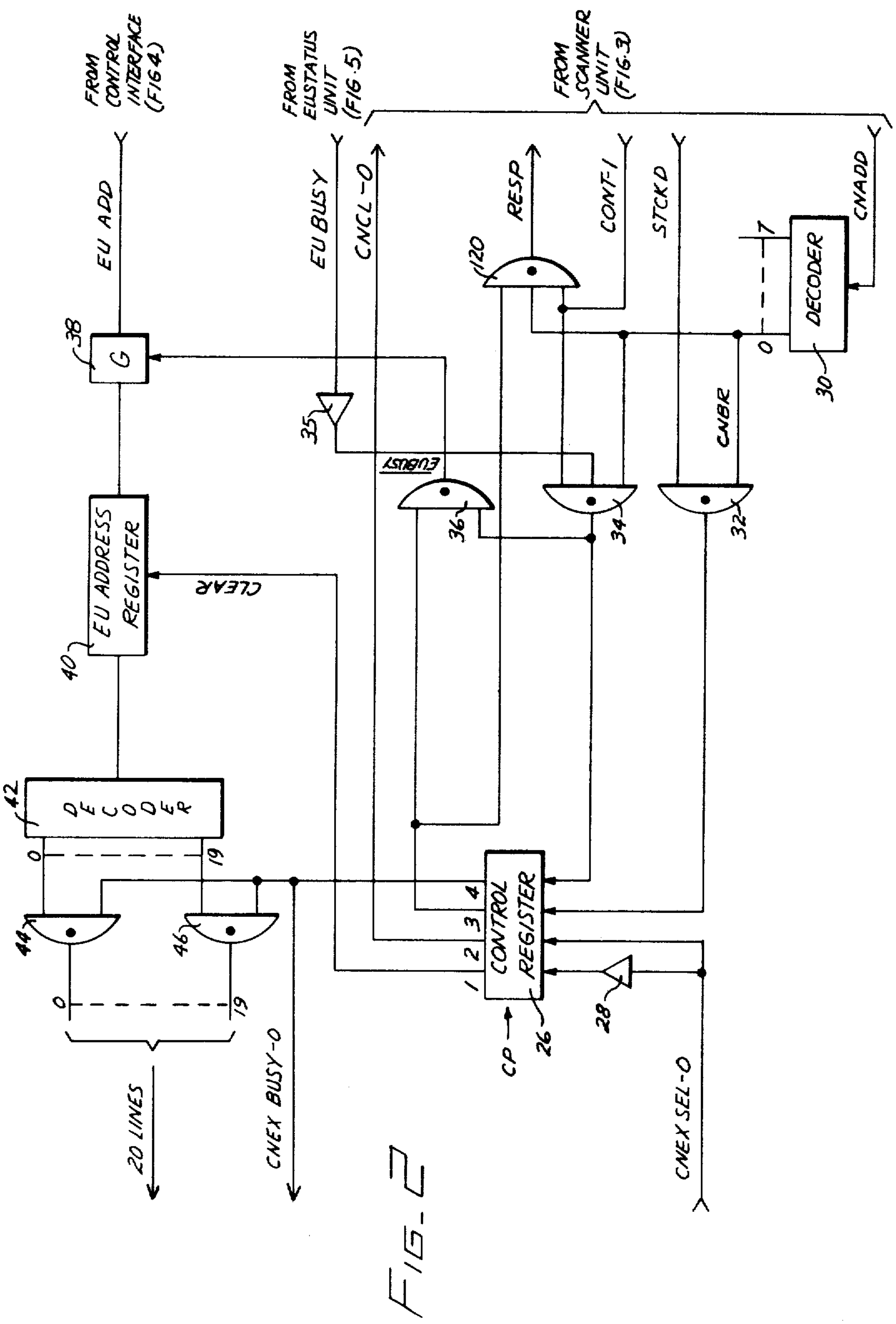
FIG. 2 is a schematic block diagram of one of the control status units of FIG. 1.

Referring to FIG. 2, one of the control status units is shown in detail. Each control status unit includes a control register 26 which is set through four successive control states 1–4 in response to four input signals, the change of state always being synchronized with a clock pulse CP. Whenever the associated requesting unit CN is not requesting a connection through the switching matrix, the signal on the line CNEXSEL is off. This signal is applied through an inverter 28 to the first stage of the control register 26, causing the control register to be set to state 1 or the Idle state.

When the CNEXSEL–0 line goes true, indicating that a request is being made by the requesting unit CN–0, the control register 26 is set to control state 1 by the next clock pulse CP, providing an output signal on the line CNCL–0. This line signals the scanner unit 18 to store the address of the particular requesting unit CN–0 in the bottom of the stack memory.

As hereinafter described in connection with FIG. 3, the scanner unit 18, at the time it stores the CN–0 address in the stack memory 20, provides the same address on an output line designated CNADD. This line goes to a decoder circuit 30 which is common to all of the control status units. Depending upon the address at the input of the decoder 30, one of eight output lines is activated. The output line CNBR for the requesting unit CN–0 goes to the associated control status unit, as shown in FIG. 2, and is applied to a logical AND circuit 32, which also receives a signal STCKD from the scanner unit 18. The STCKD signal from the scanner unit 18 indicates that the address has been placed in the bottom of the stack.

The output of the logical AND circuit 32 causes the control register 26 to advance to control state 3. While in this state, the control status unit waits for the scanner unit 18 to scan through the word stored in the stack memory 20. Whenever an address is read out of the stack memory 20 during the scan operation, the scanner unit 18 generates a control signal on an output line, designated CONT–1. This signal on the CONT–1 line is applied to a logical AND circuit 34 together with the CNBR line from the decoder 30. The CNBR line signals that the address read out of the stack memory 20 is the address of the corresponding requesting unit CN–0. A third input to the AND circuit 34 is derived from the EUBUSY line from the EU status unit 24 through an inverter 35. Thus if the EUBUSY signal is off, indicating that the requested terminal unit is not busy, the output of the logical AND circuit 34 then causes the control register 26 to advance to control state 4 in synchronism with the next clock pulse CP.

The output of the logical AND circuit 34 is also applied to one input of a logical AND circuit 36 to which the output of state 3 of the control register is also applied. The output of the logical AND circuit 36 is applied to a gate 38 which gates the address of the terminal unit designated by the output EUADD from the control interface 22 to an EU address register 40. The output of the EU address register 40 is applied to a decoder 42 which activates one of 20 output lines, corresponding to one of the 20 terminal units EU. Each of the 20 output lines from the decoder 42 is applied to a corresponding AND circuit, two of which are indicated at 44 and 46. Control state 4 of the control register 26 is also applied to each of these AND circuits. The output lines from these AND circuits form the 20 lines which go to the 20 cross-points in the switching matrix 10 associated with the information lines from the particular requesting units CN–0. Thus when the control register 26 advances to state 4, is causes the desired connection to be completed in the switching matrix 10. The control register 26 remains in state 4 until the requesting unit CN–0 turns off the request line CNEXSEL–0, thereby causing the control register 26 to return to the initial Idle state. The EU address register 40 is then cleared in anticipation of receiving the next request.

Figure 3A:
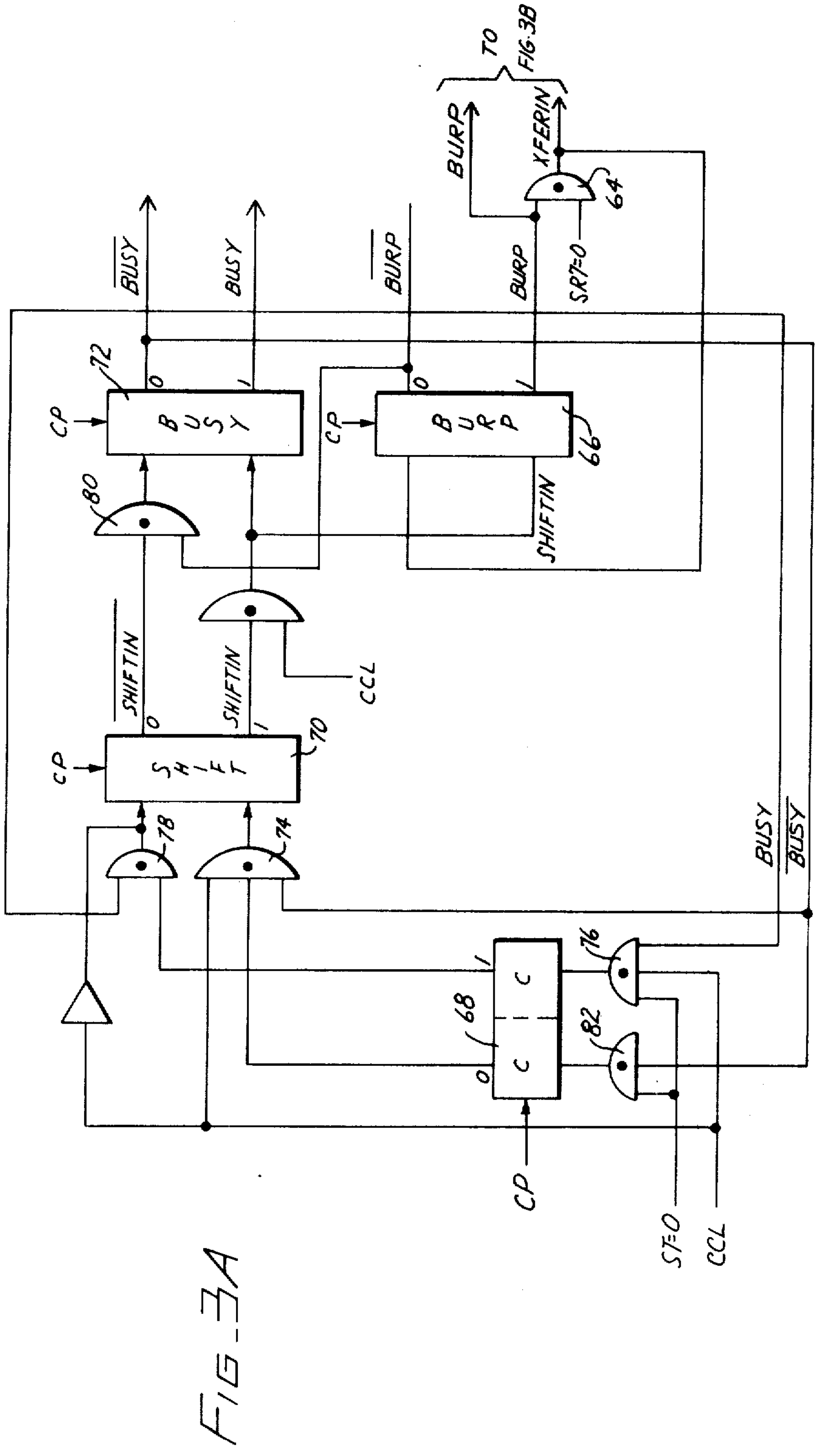
FIGS. 3A and 3B show a schematic block diagram of the scanner unit and associated stack memory.
Figure 3B:
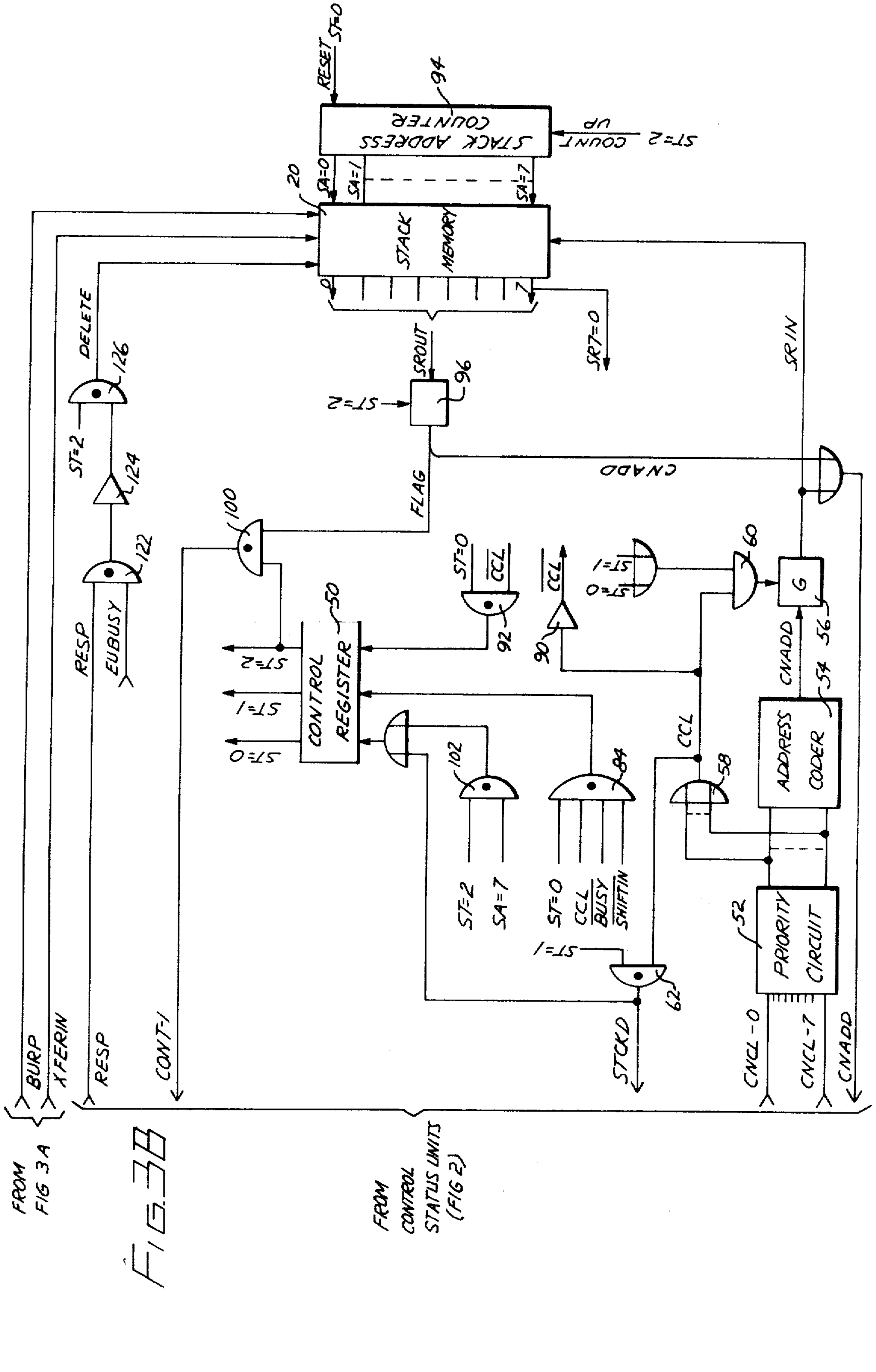

The operation of the scanner unit 18 and associated stack memory 20 are shown in more detail in FIGS. 3A and 3B. The scanner unit includes a control register 50 having three control states, designated ST=0, ST=1, and ST=2. The control register 50 can be set to any one of these states in synchronism with a clock pulse CP in response to three inputs.

The CNCL lines from the control status units are applied to a priority circuit 52. The purpose of the priority circuit 52 is to resolve a conflict between two control status units which are set to state 2 at the same clock time. The priority circuit 52 has a corresponding number of output lines, only one of which is activated at a time in response to one or more inputs being on. For example, the priority circuit may give highest priority to control status unit 0 and lowest priority to control status unit 7. Thus the priority circuit 52 activates an output line corresponding to the highest priority input line which is on.

The output lines from the priority circuit 52 are connected to an address coder circuit 54 which generates a binary coded address identifying the particular control status unit and the associated requesting unit initiating a request. This coded address is applied through a gate 56 to the bottom of the stack memory 20.

The stack memory 20 comprises eight registers having addresses from the top to the bottom designated SA=0 through SA=7. All inputs to the stack memory are through the SRIN line which goes to the bottom register or address SA=7 of the stack memory. Each register in the stack memory includes a flag bit which is turned on when the register is storing an address and which is turned off when the register is cleared. Control circuitry associated with the stack memory responds to an input signal XFERIN, signaling an input transfer operation, for causing the information on the SRIN line to be stored in the lowest register in the stack. This register is first cleared by adjusting the contents of all registers upward in the stack memory in response to a control signal designated BURP.

Whenever a CNCL line from one of the control status units is on, indicating that the control status is requesting the storage of a requesting unit address in the stack memory, the output CCL of an OR circuit 58 goes on. The OR circuit 58 is connected to the output lines of the priority circuit 52. The line CCL is applied to a logical AND circuit 60 together with the ST=0 state and the ST=1 state from the control register 50. The output of the logical AND circuit operates the gate 56 for gating the requesting unit address CNADD to the bottom register of the stack memory 20. The CCL line is also applied to a logical AND circuit 62 together with the ST=1 state of the control register 50 for generating the control signal STCKD which goes to each of the control status units to advance the control register in the particular control status unit in the manner described above in connection with FIG. 2. The output of the AND circuit 62 also resets the control register 50 to the ST=0 state. Thus during the ST=0 and ST=1 state, the address of the contending requesting unit is loaded in the stack memory 20 and during the ST=1 state, the associated control status unit is advanced to the control state 3 in which it is awaiting a connection to the requested terminal unit EU.

Operation of the stack memory 20 in entering a new address into the bottom of the stack is controlled by two input levels, designated BURP and XFERIN. The BURP level causes the stack memory to adjust the stack memory upward so as to clear the bottom register of the stack memory. The XFERIN level causes the new address on the SRIN line to be stored in the lowest order register of the stack memory 20. The XFERIN level is generated by the output of a logical AND circuit 64 which senses when the BURP level is on and also senses when the bottom stack register SR–7 has the flag bit off, indicating the lowest order register at the bottom of the stack memory is empty.

The BURP level is controlled by a control flip-flop 66, which is set to 1 when an address is to be shifted into the bottom of the stack and which is reset to 0 by the output of the logical AND circuit 64. The shift-in operation is initiated in response to a control flip-flop 68, a control flip-flop 70 which signals the shift-in operation, and a control flip-flop 72 which indicates when the stack memory is busy. Assuming that the control register 50 is in the ST=0 state and the CCL line is true, signaling that there is an address to store in the bottom of the stack memory, and assuming that the SHIFT flip-flop 70 is set to 0 and the BUSY flip-flop 72 is 0, and the control flip-flop 68 is initially set to 0, as soon as the CCL level goes true, a logical AND circuit 74 sets the SHIFT flip-flop 70 to 1 with the next clock pulse. As a result the BURP level is turned on and the BUSY flip-flop 72 is set to 1. The next clock pulse, in response to the output of a logical AND circuit 76 sets the control flip-flop 68 to 1. This causes the SHIFT flip-flop 70 to be reset to 0 by the output of a logical AND circuit 78 which senses that the BUSY condition is still present. After address information is transferred into the stack register, the BURP flip-flop 66 is reset, causing the BUSY flip-flop 72 to be reset by the output of a logical AND circuit 80. With the next clock pulse, the control flip-flop 68 is reset by the output of a logical AND circuit 82, completing the input operation of the stack memory. At this time, the output of a logical AND circuit 84 advances the control register 50 to the ST=1 state, the AND circuit 84 sensing that the CCL line is on and that the SHIFT flip-flop 70 and the BUSY flip-flop 72 are reset to 0, as indicated by the $\overline{\text{BUSY}}$ and the $\overline{\text{SHIFTIN}}$ lines.

As pointed out above, with the control register 50 in the ST=1 state, the logical AND circuit 62 generates the STCKD signal which in turn sets the control status unit register 26 to its next state and resets the control register 50 to the ST=0 state. If the CCL line remains on because another control status unit is also contending, the priority circuit 52 activates another one of its output lines at this time and the new address is inserted in the bottom of the stack memory, in the manner described above. If no other status control unit is contending, the $\overline{\text{CCL}}$ line will go true at the output of an inverter 90. This is applied to a logical AND circuit 92 together with the ST=0 state, the output setting the control register 50 to the ST=2 state with the next clock pulse.

During the ST=2 state of the control register 50 in the scanner unit 18, a scan operation of the stack memory 20 is carried out. Readout from the registers of the stack memory 20 is under the control of a stack address counter 94 which is reset to SA=0 during the ST=0 state of the control register 50. This causes the top address in the stack memory to be addressed and the contents of that register to be coupled to the SROUT line. A gate 96, during the ST=2 state, couples the address portion of the output to be applied to the CNADD line going to the decoder 30. The CNADD line also goes to a decoder 98 in the control interface circuit 22 ( See FIG. 4). The flag bit of the word read out from the stack memory 20 is applied to a logical AND circuit 100 together with ST=2, the output of the AND circuit 100 providing the control signal CONT–1 which goes to each of the control status units and the control interface 22.

With each successive clock pulse, the stack address counter is advanced to the next address count condition until it addresses the bottom of the stack memory, as indicated by the address line SA=7. This is applied to a logical AND circuit 102 together with the ST=2 state, the output of the AND circuit 102 terminating the scan operation by resetting the control register 50 back to the ST=0 state.

Figure 5:
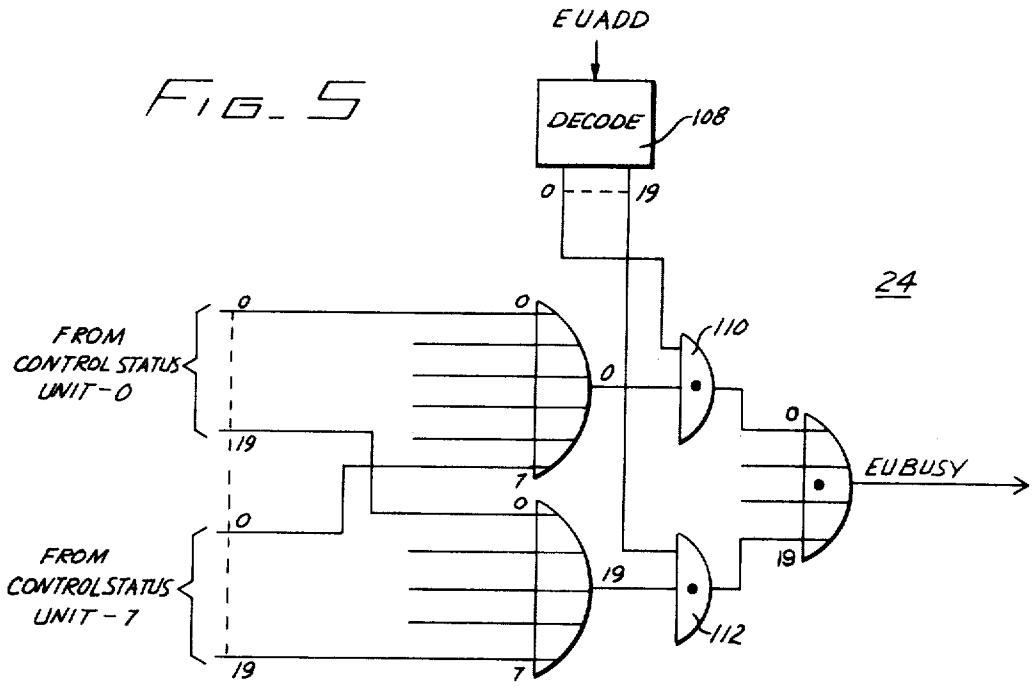
FIG. 5 is a schematic block diagram of the EU status unit of FIG. 1.
Figure 4:
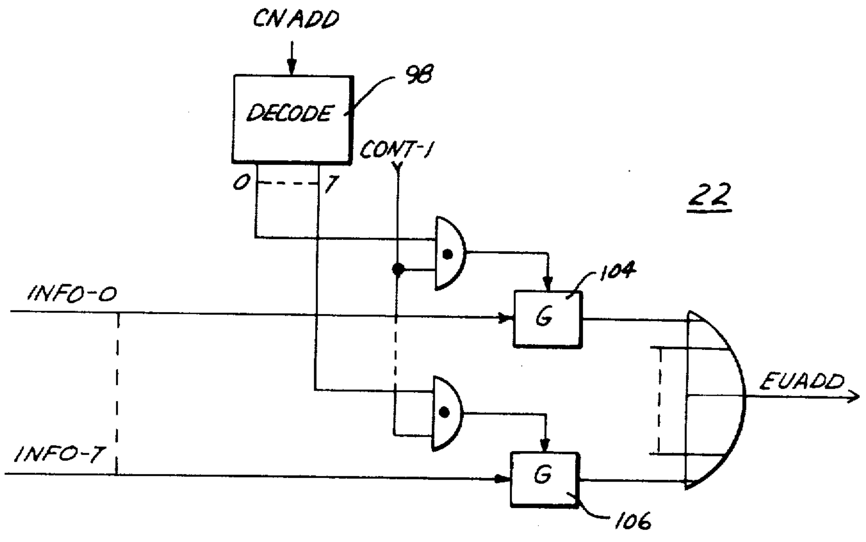
FIG. 4 is a schematic block diagram of the control interface unit of FIG. 1.

As each requesting unit address stored in the stack memory 20 is read out, the control interface circuit 22 produces the address EUADD of the terminal unit being requested. The logic for accomplishing this is shown in FIG. 4 in which the terminal address specifying information lines from each of the requesting units are selectively gated to the output line EUADD. Two of the gates are indicated at 104 and 106. The output of the decoder 98 selects which of the gates is activated. The terminal unit address EUADD in turn is applied to the EU status unit 24, which is shown in detail in FIG. 5. A decoder 108 activates one of 20 output lines, depending upon which of the 20 terminal units is specified by the address EUADD. These lines are applied respectively to one input of a group of 20 logical AND circuits, two of which are indicated at 110 and 112. If any one of the control status units has activated one of its 20 output lines corresponding to the particular terminal unit identified by the output of the decoder 108, the output of a corresponding one of the logical AND circuits produces a busy signal, designated EUBUSY.

As pointed out above in connection with the description of FIG. 2, if the EUBUSY line stays off when the CONT–1 control line comes on, the status unit associated with a particular requesting unit is advanced by the output of the logical AND circuit 34 to its next control state 4, indicating that the desired connection has been completed. If the EUBUSY line comes on, indicating that the terminal unit is busy and a connection cannot be completed by the switching matrix, the control register 26 in the particular control status unit remains unchanged, and the stack memory 20 scans on to the next register in the stack.

If the EUBUSY line stays off, indicating that the terminal unit is not busy, the corresponding address must be deleted from the stack memory 20. This is accomplished by means of a logical AND circuit 120 in each of the status control units. ( See FIG. 2). The logical AND circuit 120 senses that the control register 26 is in the control state 3, that the control signal CONT–1 is on and that the address read out of the stack memory on the CNADD line to the decoder 30 has activated the CNBR line in the control status unit. The output of the logical AND circuit 120, designated RESP, is applied to a logical AND circuit 122 together with the EUBUSY signal. ( See FIG. 3B). The output of the AND circuit 122 is inverted by an inverter 124 and applied to a logical AND circuit 126 together with the ST=2 line from the control register 50. The output of the logical AND circuit 126 is applied to the stack memory for deleting the contents of the addressed register in the stack memory by setting the flag to 0 in the particular register. Thus the contents are deleted from the stack memory during the scan operation when the desired connection is completed.

Figure 6:
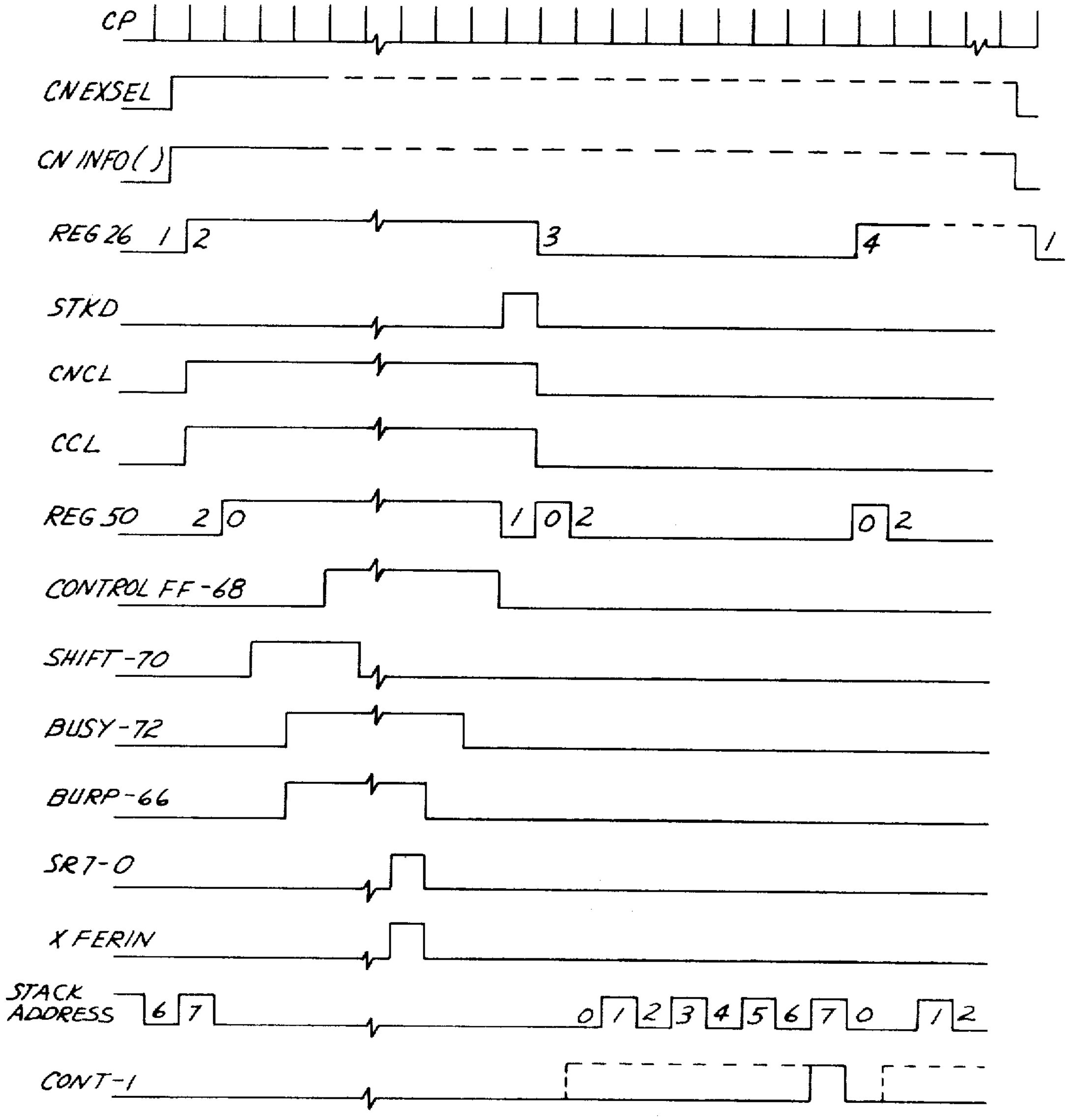
FIG. 6 is a timing diagram useful in understanding the operation of the control circuit.

The operation of the switching matrix control circuit is best summarized by reference to the timing diagram of FIG. 6. The diagram shows the timing operation when the first request from one requesting unit is received by way of the CNEXSEL line. If other requests waiting connection have been stored in the stack memory, these are serviced during the same scan cycle in which the stack address scans from SA=0 through SA=7. The only difference in the timing diagram would be that the CONT–1 signal would go on for each register scanned in the stack which stores an address and has the flag bit turned on. Thus the circuit repeatedly scans all requests in the order in which they are received and completes a connection whenever the requested terminal unit is not busy.

From the above description it will be recognized that a control circuit for contro lling a cross-point switching matrix has been provided which always stores requests on a first-come, first-served basis. Where two or more requests are received within a time interval which is less than the time it takes to store one address in the stack memory 20, an additional priority resolution is provided by the priority circuit 52. Because the contents of the stack memory are read out sequentially, completion of only one connection at a time need be made.

What is claimed is:

1. Apparatus for operating a cross-point switching matrix to connect a plurality of requesting units to selected ones of a plurality of terminal units where each requesting unit signals a request for connection and signals the identification of the terminal unit, the apparatus comprising a plurality of control status circuits corresponding in number to the number of requesting units, each control status circuit controlling each of the cross-points in the matrix associated with one requesting unit, a stack memory having a number of storage locations corresponding to the number of requesting units, means responsive to any of said control status circuits when a request signal is received from the corresponding one of the requesting units for inserting a coded word identifying the requesting unit into the stack memory, a scanning circuit, means responsive to the scanning circuit for reading out each of the request identifying words from the stack memory in sequence, each status circuit including means responsive to a word identifying the associated one of the requesting units when read out of the memory for activating the cross-point connection between the requesting unit and the particular terminal unit identified by the requesting unit.

2. Apparatus as defined in claim 1 wherein said means for inserting a coded word into the stack memory includes a priority circuit for inserting a coded word identifying one of the requesting units at a time into the stack memory on a predetermined priority basis where two or more simultaneous requests are initiated by the control status units.

3. Apparatus as defined in claim 1 further including means signaling when a particular terminal unit is busy, and means inhibiting said cross-point activating means when the particular terminal unit is busy.

4. Apparatus as defined in claim 3 further including means for deleting the corresponding word from the stack memory when the cross-point connection is activated.

5. Apparatus as defined in claim 3 further including means activating the scanning circuit to repeatedly scan the contents of the stack memory, and means interrupting said scanning circuit whenever a new request unit identifying word is being inserted in the stack memory.

6. Apparatus as defined in claim 5 wherein the scanning circuit scans the words stored in the stack memory in the reverse order in which the words were inserted into the stack.

7. A control circuit for a cross-point switching matrix interconnecting any one of a first group of devices and any one of a second group of devices in response to input signals identifying the devices in each group to be interconnected, the control circuit comprising means for storing a plurality of device identifying words, means responsive to said input signals for inserting a word in the storing means for each device of the first group requiring a connection to a device of the second group, the words being inserted in the order in which the input signals are received, means scanning the words in the storing means in predetermined sequence, and means responsive to each word as it is scanned in the storing means and the input signals for completing the cross-point connection in the switching matrix between the device in the first group identified by the stored word and the device in the second group identified by the input signals.

8. Apparatus as defined in claim 7 further including means signaling when a particular device in the second group is busy, and means inhibiting said cross-point connection completing means in response to a busy signal by said signaling means.

9. Apparatus as defined in claim 7 further including means for deleting a particular word from the storing means when the corresponding cross-point connection is completed.

10. Apparatus as defined in claim 7 wherein the scanning means scans the words in the storing means in the reverse order in which the words are inserted into the storing means.

11. Apparatus for operating a cross-point switching matrix to connect a plurality of requesting units to selected ones of a plurality of terminal units where each requesting unit signals a request for connection and signals the identification of the terminal unit, the apparatus comprising a plurality of control status circuits corresponding in number to the number of requesting units, each control status circuit controlling each of the cross-points in the matrix associated with one requesting unit, each control status unit including a control register having a plurality of control states, the control register advancing in sequence through said states, means responsive to a request signal from the associated one of the requesting units for advancing the control register from a first state to a second state, a stack memory, a scanner control circuit for the stack memory including means responsive to the control register in any of the control status units when in said second state for adjusting the contents of the stack memory and inserting a new word identifying the control status unit and associated requesting unit in one end of the stack memory, means advancing the control register in that particular control status unit to a third state when the identifying word has been stored, means responsive to the control registers in the control status units for reading out each of the words from the stack memory in sequence whenever none of said control registers is in the second state, means responsive to each word read out of the stack memory for signaling if the terminal unit signaled by the requesting unit identified by the word read out of the stack memory is available, and means responsive to said available signal for completing the cross-point connection in the switching matrix between the requesting unit and the terminal unit if the terminal unit is available, said last-named connection completing means including means for advancing the control register in the associated control status unit to a fourth state and deleting the identifying work from the stack memory.

12. Apparatus as defined in claim 11 further including priority means associated with said word inserting means for causing one identifying word at a time to be inserted in the stack memory when two or more control registers are simultaneously in the second state.

* * * * *